(12) United States Patent
Tang

(10) Patent No.: US 12,333,140 B2
(45) Date of Patent: Jun. 17, 2025

(54) MEMORY SYSTEM AND METHOD

(71) Applicant: Kioxia Corporation, Tokyo (JP)

(72) Inventor: Yifan Tang, Kanagawa (JP)

(73) Assignee: Kioxia Corporation, Tokyo (JP)

( * ) Notice: Subject to any disclaimer, the term of this patent is extended or adjusted under 35 U.S.C. 154(b) by 90 days.

(21) Appl. No.: 18/335,390

(22) Filed: Jun. 15, 2023

(65) Prior Publication Data

US 2024/0094904 A1 Mar. 21, 2024

(30) Foreign Application Priority Data

Sep. 20, 2022 (JP) .................................. 2022-149133

(51) Int. Cl.
*G06F 3/06* (2006.01)
(52) U.S. Cl.
CPC .......... *G06F 3/0604* (2013.01); *G06F 3/0631* (2013.01); *G06F 3/0634* (2013.01); *G06F 3/0679* (2013.01)
(58) Field of Classification Search
None
See application file for complete search history.

(56) References Cited

U.S. PATENT DOCUMENTS

| 9,507,711 | B1 | 11/2016 | Kotte et al. |
| 11,262,942 | B2 | 3/2022 | Wu et al. |
| 2005/0204091 | A1* | 9/2005 | Kilbuck ................... G11C 7/10 711/103 |
| 2015/0254011 | A1* | 9/2015 | Ueki ..................... G06F 3/0652 711/103 |
| 2020/0050362 | A1 | 2/2020 | Lee et al. |

* cited by examiner

*Primary Examiner* — Yaima Rigol
(74) *Attorney, Agent, or Firm* — Maier & Maier, PLLC

(57) ABSTRACT

According to one embodiment, a memory system comprises a first memory including a nonvolatile memory cell array, a second memory configured to operate at higher speed than the first memory, and a memory controller. The memory controller executes, in response to a write command from a host, data transfer from the host to the second memory, a data-in operation, and a program operation, with respect to first data instructed to be written by the write command. After the data-in operation for the first data is started and before the data-in operation is completed, the memory controller transfers the first data from the second memory to the host in response to a read command to read the first data. After the program operation for the first data is started, the memory controller transfers the first data from the first memory to the host in response to the read command.

18 Claims, 12 Drawing Sheets

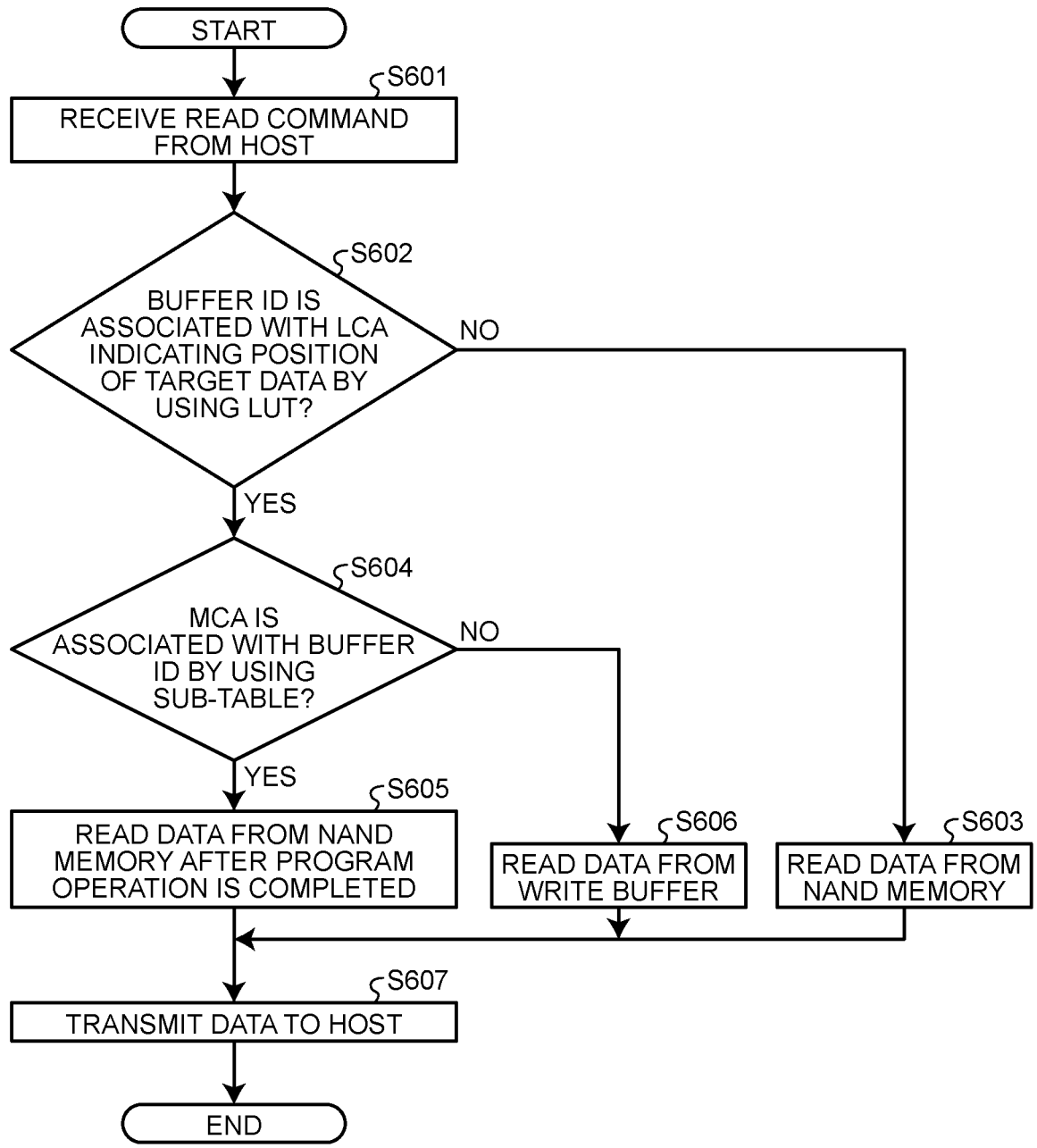

MEMORY SYSTEM AND METHOD

CROSS-REFERENCE TO RELATED APPLICATIONS

This application is based upon and claims the benefit of priority from Japanese Patent Application No. 2022-149133, filed on Sep. 20, 2022; the entire contents of which are incorporated herein by reference.

FIELD

Embodiments described herein relate generally to a memory system and a method.

BACKGROUND

A memory system including a nonvolatile memory such as a NAND flash memory typically includes a buffer memory in which transfer data between a host and the nonvolatile memory is temporarily stored. The efficient use of the buffer memory contributes to improving the performance of the memory system.

BRIEF DESCRIPTION OF THE DRAWINGS

FIG. 14 is a flowchart illustrating an example of a read command process by the memory controller according to the embodiment.

DETAILED DESCRIPTION

In general, according to one embodiment, a memory system is connectable to a host. The memory system comprises a first memory including a nonvolatile memory cell array, a second memory configured to operate at higher speed than the first memory, and a memory controller. The memory controller is configured to: in response to a write command from the host, with respect to first data instructed to be written by the write command, execute a first operation and a second operation, and cause the first memory to execute a third operation. The first operation is data transfer from the host to the second memory. The second operation is data transfer from the second memory to the first memory. The third operation is an operation by which the first memory writes data transferred by the second operation to the memory cell array. The memory controller is further configured to, in response to a read command from the host to read the first data, between a first timing that is a timing at which the second operation for the first data is started and a second timing that is a timing at which the second operation for the first data is completed, transfer, from the second memory to the host, second data that is the first data stored in the second memory by the first operation. The memory controller is further configured to, in response to the read command from the host to read the first data, after a third timing that is a timing at which the third operation for the first data is started, acquire, from the first memory, third data that is the first data written to the memory cell array by the third operation, and transfer the third data to the host.

Exemplary embodiments of a memory system and a method will be explained below in detail with reference to the accompanying drawings. The present invention is not limited to the following embodiments.

Embodiment

Figure 1:
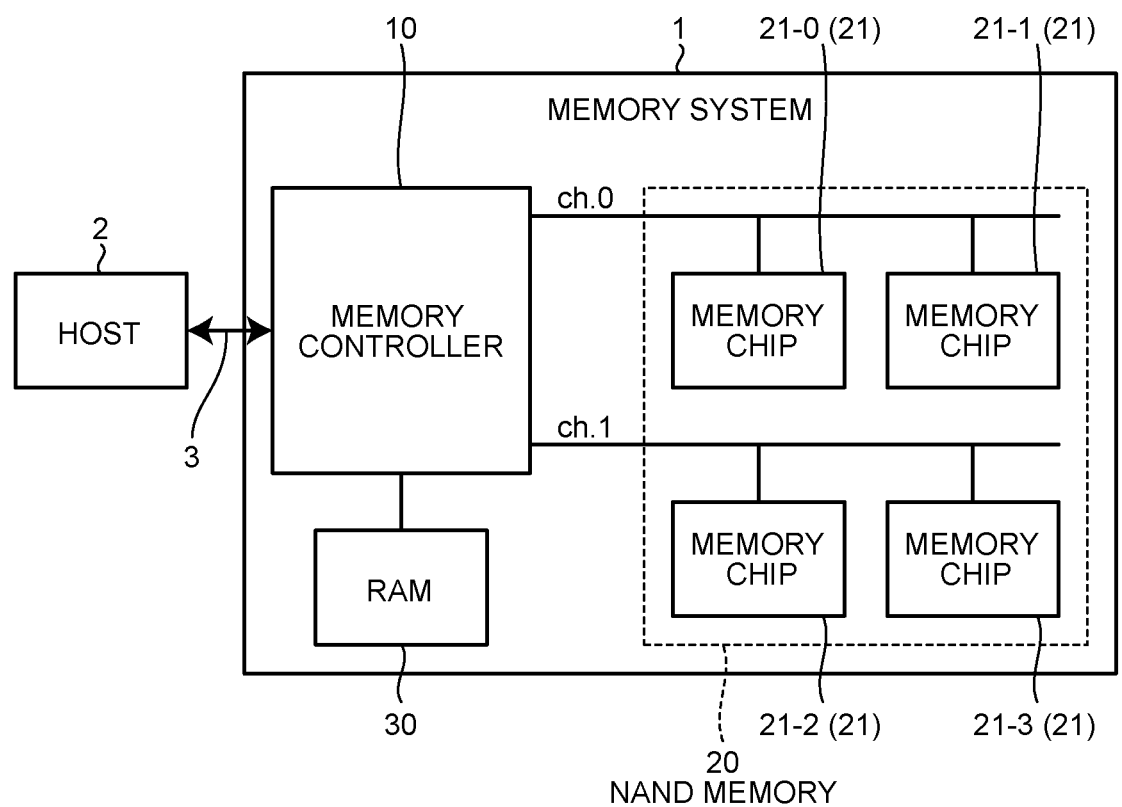
FIG. 1 is a schematic diagram illustrating an example of a hardware configuration of a memory system according to an embodiment.

FIG. 1 is a schematic diagram illustrating an example of a hardware configuration of a memory system 1 according to an embodiment.

The memory system 1 is connectable to a host 2 via a communication path 3. A standard on which the communication path 3 and communication via the communication path 3 are based is not limited to a specific standard. The host 2 is a personal computer, a personal digital assistant, or a server, for example.

When accessing the memory system 1, the host 2 transmits an access command to the memory system 1. The access command includes a write command, a read command, or the like. The access command is accompanied with a logical address and size information. The logical address is information indicating an arrangement position of data in a logical address space, which is provided to the host 2 by the memory system 1. Note that the logical address may be also referred to as LCA (logical cluster address) or LBA (logical block address). The size information included in the access command indicates a consecutive range on the logical address space of which the head is a position designated by the logical address. In other words, for each access command, the host 2 specifies an access range on the logical address space based on the logical address and the size information.

Note that a logical address is defined every data unit that is referred to as a cluster in one example. In other words, only one cluster may be arranged in a range indicated by one logical address on the logical address space. Herein, a logical address is described as LCA.

The host 2 transmits data to be written corresponding to a write command to the memory system 1. Such data transmitted to the memory system 1 from the host 2 is described as write data.

The memory system 1 includes a memory controller 10, a NAND flash memory (NAND memory) 20, and a random access memory (RAM) 30.

The NAND memory 20 is a nonvolatile memory functioning as a storage in which write data is stored.

The memory controller 10 executes the control for the memory system 1. The control includes the control for data transfer between the host 2 and the NAND memory 20. The memory controller 10 uses the RAM 30 as a buffer memory (one or more write buffers 301 to be described later) for data transfer, or uses the RAM 30 as a cache memory in which management information is cached. A lookup table (LUT) 302 and a sub-table 303 to be described later are an example of the management information.

The RAM 30 may be configured of a dynamic random access memory (DRAM), a static random access memory (SRAM), or a combination of these. Note that a function to be performed by the RAM 30 may be realized by any other kind of memory that can operate at a higher speed than the NAND memory 20. The function to be performed by the RAM 30 may be realized by two or more kinds of memories.

The memory controller 10 may be configured as a System-On-a-Chip (SoC), for example. The memory controller 10 may be configured of a plurality of chips. The RAM 30 may be arranged inside the memory controller 10 configured as an SoC, or may be arranged outside the memory controller 10 as illustrated in FIG. 1.

The NAND memory 20 is configured of one or more memory chips 21. The one or more memory chips 21 are respectively connected to the memory controller 10 via one or more channels. In the example illustrated in FIG. 1, the NAND memory 20 includes memory chips 21-0, 21-1, 21-2, and 21-3. The memory chips 21-0 and 21-1 are connected to the memory controller 10 via a channel ch.0. The memory chips 21-2 and 21-3 are connected to the memory controller 10 via a channel ch.1. Note that the number of the memory chips 21 constituting the NAND memory 20 and the number of the channels connecting the NAND memory 20 and the memory controller 10 are not limited to these.

Figure 2:
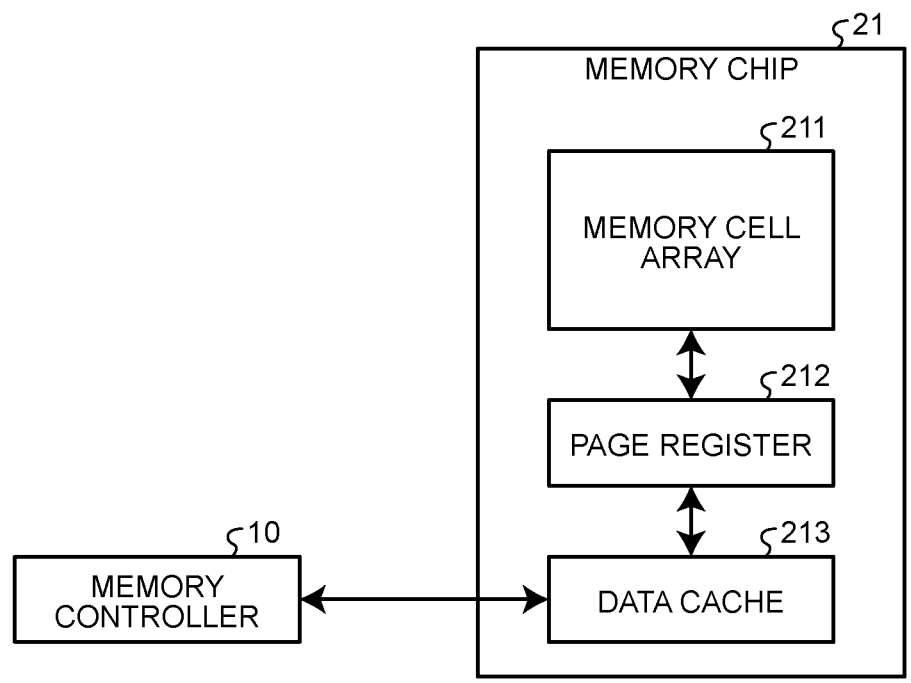
FIG. 2 is a schematic diagram illustrating an example of a configuration of a memory chip according to the embodiment.

FIG. 2 is a schematic diagram illustrating an example of a configuration of the memory chip 21 according to the embodiment. The memory chip 21 includes a memory cell array 211, a page register 212, and a data cache 213.

The memory cell array 211 can store therein data in a nonvolatile manner. The memory cell array 211 includes a plurality of blocks. All data stored in one block are collectively erased. Each block includes a plurality of storage areas of which each is referred to as a page. Consecutive physical addresses are assigned to each page. The write and read with respect to the memory cell array 211 are performed in a page unit. The size of one page is larger than the size of one cluster in one example.

A physical address that is address information indicating a position in the memory cell array 211 is described as a media cluster address (MCA). The MCA indicates a position within the NAND memory 20 in a cluster unit.

The page register 212 is configured of an SRAM, for example. The page register 212 has a capacity of at least the size of one page. The data to be written received from the memory controller 10 is stored in the page register 212 until the write with respect to the memory cell array 211 is completed. Moreover, data read from the memory cell array 211 is once stored in the page register 212.

The data cache 213 is configured of an SRAM, for example. The data cache 213 is a memory functioning as a buffer memory for data transfer between the memory controller 10 and the memory chip 21. The data transferred to the memory chip 21 from the memory controller 10 is first stored in the data cache 213, and is then written to the memory cell array 211 via the page register 212.

Data, which is read from the memory cell array 211 and is stored in the page register 212, is transferred to the memory controller 10 via the data cache 213.

An operation of transferring data from the memory controller 10 to the memory chip 21 (more accurately, the data cache 213) is described as a data-in operation. An operation by the memory chip 21 of writing the data, which is received in the data cache 213 by the data-in operation, to the memory cell array 211 is described as a program operation.

Figure 3:
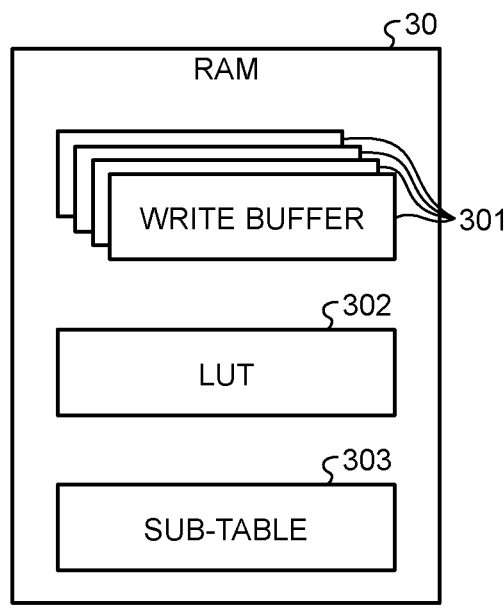
FIG. 3 is a schematic diagram illustrating an example of a configuration of a random access memory (RAM) according to the embodiment.

FIG. 3 is a schematic diagram illustrating an example of a configuration of the RAM 30 according to the embodiment.

The one or more write buffers 301 may be allocated in the RAM 30. The write data for one cluster may be stored in each of the one or more write buffers 301. Note that the write buffer 301 may be described as a "WB" in the following drawings.

Numerical information may be assigned to each of the write buffers 301 as identification information. The numerical information to be assigned to each of the write buffers 301 is described as a buffer ID.

The LUT 302 and the sub-table 303 may be stored in the RAM 30 as the management information. The LUT 302 and the sub-table 303 are information in which a correspondence relationship between the LCA and a position in the memory system 1 of a cluster corresponding to the LCA is recorded. Note that, in the embodiment, information in which the correspondence relationship between the LCA and the position in the memory system 1 of the cluster corresponding to the LCA is recorded has a data structure as a table. However, the data structure of such information may not be limited to the data structure as a table.

Moreover, a part or the whole of the LUT 302 may be stored in the NAND memory 20. The LUT 302 may be stored in the NAND memory 20, and a part or the whole of the LUT 302 may be cached in the RAM 30. The LUT 302 stored in the RAM 30 may be saved in the NAND memory 20 on a timely basis.

The sub-table 303 may be stored in the NAND memory 20. The sub-table 303 stored in the RAM 30 may be saved in the NAND memory 20 on a timely basis.

Note that the LUT 302 is an example of first management information and the sub-table 303 is an example of second management information. The RAM 30 is an example of a second memory, which is to be used as a buffer memory. Moreover, the RAM 30 is an example of a third memory, in which the LUT 302 as the first management information is stored. Moreover, the RAM 30 is an example of a fourth memory, in which the sub-table 303 as the second management information is stored. Some or all of the second memory, the third memory, and the fourth memory may be configured of respective different memories.

Figure 4:
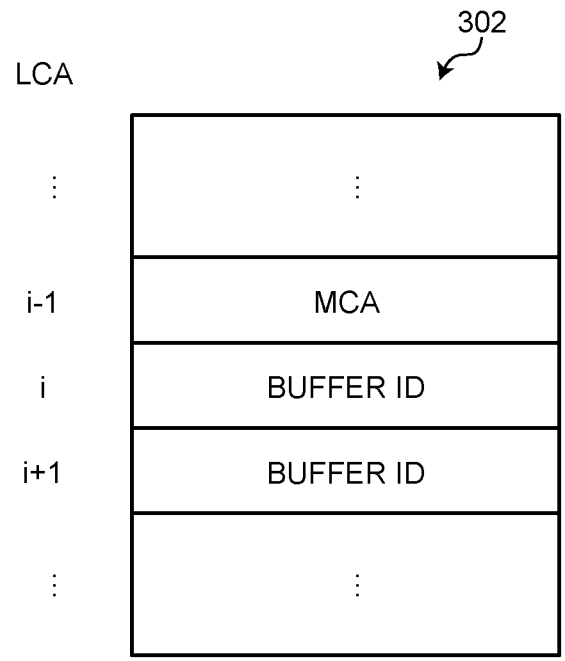
FIG. 4 is a schematic diagram illustrating an example of a structure of a lookup table (LUT) according to the embodiment.

FIG. 4 is a schematic diagram illustrating an example of a structure of the LUT 302 according to the embodiment.

The LUT 302 is a table in which the MCA or the buffer ID may be registered every LCA. In other words, a correspondence relationship between the LCA and the MCA or the buffer ID is registered in the LUT 302.

Figure 5:
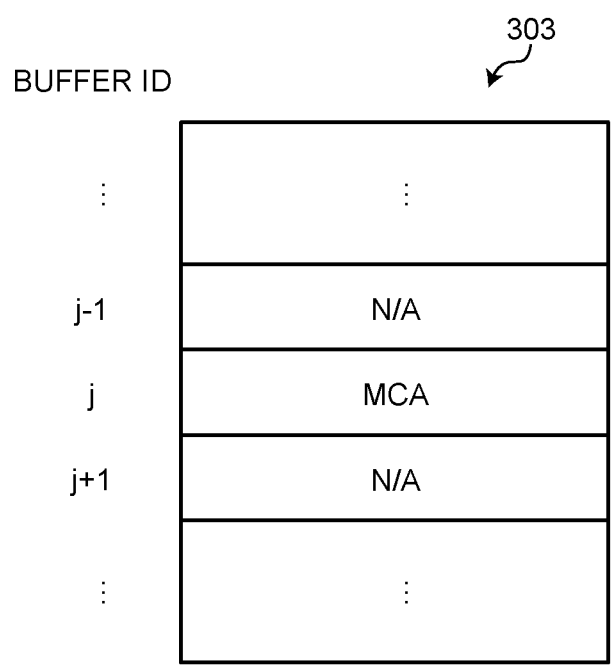
FIG. 5 is a schematic diagram illustrating an example of a structure of a sub-table according to the embodiment.

FIG. 5 is a schematic diagram illustrating an example of a structure of the sub-table 303 according to the embodiment.

The sub-table 303 is a table in which the MCA may be registered every buffer ID. In other words, a correspondence relationship between the buffer ID and the MCA may be registered in the sub-table 303. The sub-table 303 may include an entry in which the MCA is not registered (e.g., entry described as N/A in FIG. 5).

The MCA recorded in a certain entry of the sub-table 303 indicates the final transfer destination of a cluster (i.e., a storage position in the memory cell array 211), which has been temporarily stored in the write buffer 301 indicated by the buffer ID corresponding to that entry.

The LUT 302 and the sub-table 303 collaboratively indicates a correspondence relationship between the LCA and the position in the memory system 1 of the cluster corresponding to the LCA.

For example, in one case, a buffer ID (described as a first buffer ID) is associated with a certain LCA (described as a first LCA) in the LUT 302, and any MCA is not associated with the first buffer ID in the sub-table 303. In such a case, the first LCA is treated to be associated with the first buffer ID, in the LUT 302 and the sub-table 303.

In another case, the first buffer ID is associated with the first LCA in the LUT 302, and a certain MCA (described as a first MCA) is associated with the first buffer ID in the sub-table 303. In such the case, the first LCA is treated to be associated with the first MCA, in the LUT 302 and the sub-table 303.

Furthermore, in further another case, the first MCA is associated with the first LCA in the LUT 302, and the first MCA is not registered in the sub-table 303. In such the case, the first LCA is treated to be associated with the first MCA, in the LUT 302 and the sub-table 303.

The details of the transition of the state of the LUT 302 and the sub-table 303 will be described below.

Figure 6:
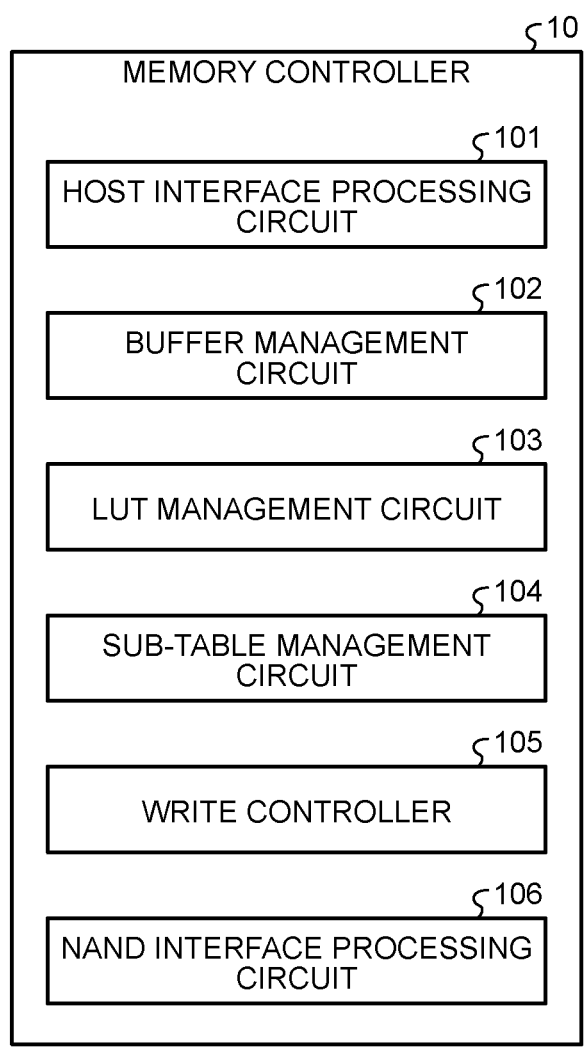
FIG. 6 is a schematic diagram illustrating an example of a configuration of a memory controller according to the embodiment.

FIG. 6 is a schematic diagram illustrating an example of a configuration of the memory controller 10 according to the embodiment.

The memory controller 10 includes a host interface processing circuit 101, a buffer management circuit 102, an LUT management circuit 103, a sub-table management circuit 104, a write controller 105, and a NAND interface processing circuit 106.

The host interface processing circuit 101 controls communication with the host 2 via the communication path 3. As part of that control, the host interface processing circuit 101 executes reception of an access command, reception of write data, transfer of the received write data to the write buffer 301, and the like.

The buffer management circuit 102 executes allocation of the write buffer 301 in the RAM 30, assignment/deassignment of a buffer ID to/from the allocated write buffer 301, and the like.

The LUT management circuit 103 executes the reference and update of the LUT 302.

The sub-table management circuit 104 executes the reference and update of the sub-table 303.

The write controller 105 controls the writing of write data to the NAND memory 20.

The NAND interface processing circuit 106 executes data transfer between the memory controller 10 and the NAND memory 20, the control for each of the memory chips 21, and the like.

Note that any of these circuits included in the memory controller 10 may be multiplexed. For example, a plurality of the LUT management circuits 103 may be provided in the memory controller 10. Moreover, a plurality of the NAND interface processing circuits 106 may be provided in the memory controller 10. For example, the memory controller 10 may include the NAND interface processing circuit 106 for each channel. Moreover, the functions of any two or more circuits of these circuits included in the memory controller 10 may be integrated by one circuit. Moreover, these circuits included in the memory controller 10 may be configured of any kinds of circuits, that are, a processor controlled by a computer program, such as a central processing unit (CPU), a field-programmable gate array (FPGA), an application specific integrated circuit (ASIC), and the like.

Write data received from the host 2 is stored in the write buffers 301 in a cluster unit, and then is transferred to the NAND memory 20 from each of the write buffers 301. When the whole of write data instructed to be written by one write command is stored in the one or more write buffers 301, the memory controller 10 notifies the host 2 of the execution completion of the write command. Therefore, by allocating many write buffers 301 in the RAM 30, the write performance is improved.

However, because mounting a high-capacity RAM is disadvantageous in terms of a cost, the capacity of a RAM mounted on the memory system tends to be constrained. In other words, the memory capacity of a RAM that can be used for allocation of write buffers has an upper limit.

It can be considered that one method for improving the write performance even if the capacity of a RAM included in the memory system is small includes a method for increasing the speed of the allocation/deallocation cycle of the write buffer. If one write buffer can be deallocated at the early timing, another write buffer can be allocated to an area that can be reused by the deallocation of the one write buffer.

On the other hand, in a case where data instructed to be read by a read command from the host is stored in a write buffer, if the memory system can transfer the data in the write buffer to the host, a response speed to the read command is improved because there is no need to access the NAND memory. Therefore, it can be considered that one method of improving the read performance includes a method of storing the write data received from the host in the write buffer as long as possible.

In the embodiment, in order to improve the write performance and the read performance together, the memory system 1 is configured to be able to transfer data from the write buffer 301 to the host 2 until the data-in operation is completed.

Specifically, the memory system 1 is configured to be able to operate in any mode of a first mode and a second mode. The first mode is a mode in which the data transfer from the write buffer 301 to the host 2 is possible until the data-in operation is started and the data transfer from the write buffer 301 to the host 2 is impossible after the data-in operation is started. The second mode is a mode in which the data transfer from the write buffer 301 to the host 2 is possible until the data-in operation is completed and the data transfer from the write buffer 301 to the host 2 is impossible after the program operation is started.

Figure 7:
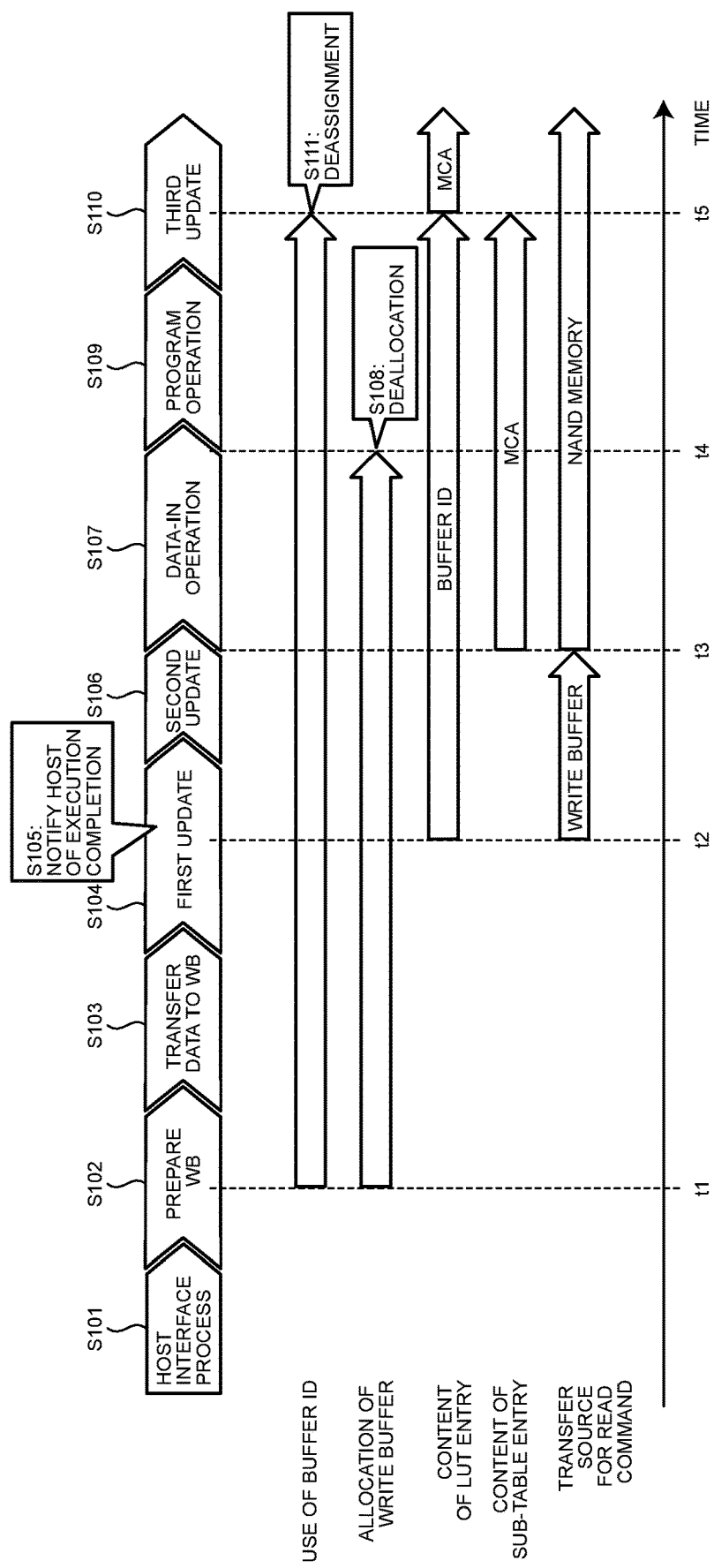
FIG. 7 is a schematic diagram explaining operations of host write in a first mode according to the embodiment.
Figure 8:
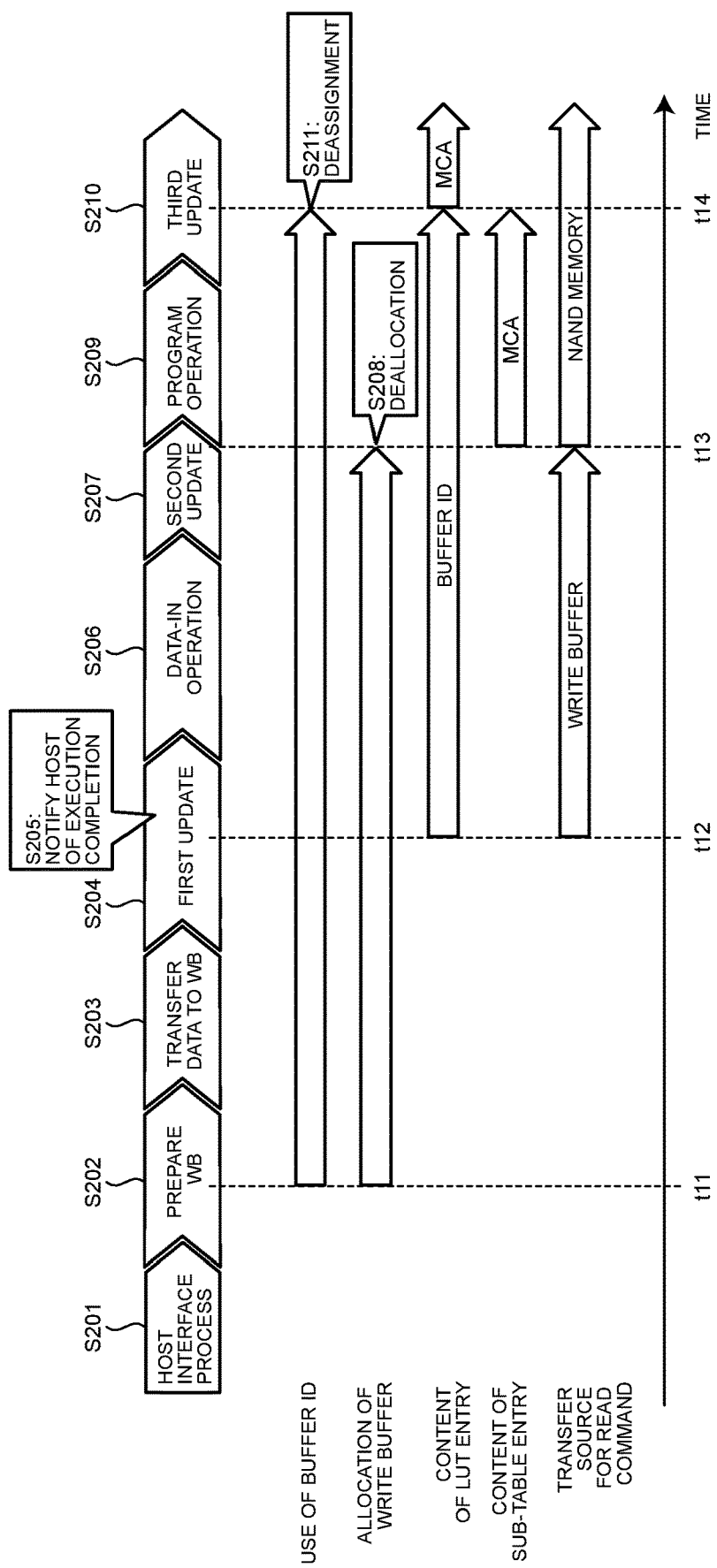
FIG. 8 is a schematic diagram explaining operations of host write in a second mode according to the embodiment.

FIGS. 7 and 8 are schematic diagrams respectively explaining operations of host write in the first mode and the second mode according to the embodiment. In these drawings, there are illustrated a series of processes constituting the operations of host write in the first mode and the second mode, a period during which the buffer ID is used in the host write, a period during which the write buffer 301 is allocated, the transition of the content of an entry in the LUT 302 corresponding to user data to be written, the transition of the content of an entry in the sub-table 303 corresponding to the user data to be written, and the transition of a transfer source of data transfer for a read command.

First, the operations of host write in the first mode according to the embodiment will be described with reference to FIG. 7.

When a write command is issued from the host 2, the host interface processing circuit 101 receives the issued write command and executes a host interface process with reference to this write command (S101). In the host interface process, the host interface processing circuit 101 specifies the LCA indicating the position of the write data in a cluster unit based on the write command.

The buffer management circuit 102 prepares a required number of the write buffers 301 (S102). Specifically, the buffer management circuit 102 executes allocation of the same number of the write buffers 301 as the number of the specified LCAs, that is, the number of clusters constituting the write data, and assignment of buffer IDs to the allocated write buffers 301. Herein, for simplicity of explanation, it is considered that one write buffer 301 is prepared.

Next, the host interface processing circuit 101 receives the write data (user data) from the host 2, and transfers the received user data to the write buffer 301 prepared in Step S102 (S103).

Next, the LUT management circuit 103 executes a first update (S104). In the first update, the LUT management circuit 103 registers the buffer ID in the LUT 302. In the first update, the LUT management circuit 103 associates the buffer ID indicating the write buffer 301 prepared by the process of Step S102 with the LCA specified by the host interface process.

Moreover, in parallel with the process of Step S104, the host interface processing circuit 101 notifies the host 2 of the execution completion of the write command (S105).

Next, the sub-table management circuit 104 executes a second update (S106). In the second update, the sub-table management circuit 104 registers the MCA in the sub-table 303. The MCA to be registered in this process is determined by the write controller 105. In the second update, the sub-table management circuit 104 associates the MCA determined by the write controller 105 with the buffer ID indicating the write buffer 301 prepared by the process of Step S102.

In the description of FIG. 7, the LCA specified by the process of Step S101 is simply described as "LCA". Moreover, the buffer ID indicating the write buffer 301 prepared by the process of Step S102 is simply described as "buffer ID". Moreover, the MCA determined before the process of Step S106 is simply described as "MCA".

Next, the NAND interface processing circuit 106 executes a data-in operation (S107). In the data-in operation, the NAND interface processing circuit 106 transfers the write data from the write buffer 301 to the NAND memory 20.

When the data-in operation is completed, the buffer management circuit 102 executes deallocation of the write buffer 301 (S108). Note that, even if the write buffer 301 is deallocated, the buffer ID indicating the write buffer 301 remains registered in the LUT 302.

Even if the write buffer 301 is deallocated, the corresponding buffer ID is used for referring to the sub-table 303, within a period from the completion of the data-in operation to the registration of the MCA into the LUT 302 after the completion of the program operation. In order to be able to acquire the accurate MCA from the sub-table 303 even in this period, the buffer ID indicating the corresponding write buffer 301 remains registered in the LUT 302 until the MCA is registered in the LUT 302.

Moreover, when the data-in operation is completed, the NAND interface processing circuit 106 causes the NAND memory 20 (more specifically, the memory chip 21) to execute the program operation (S109). In the program operation, the NAND memory 20 writes the write data to the memory cell array 211. The write destination is a position indicated by the MCA.

When the program operation is completed, the LUT management circuit 103 and the sub-table management circuit 104 executes a third update (S110). In the third update, the LUT management circuit 103 executes the updating of the LUT 302 by replacing the buffer ID associated with the LCA with the MCA. Moreover, in the third update, the sub-table management circuit 104 executes the updating of the sub-table 303 by deleting the MCA therefrom.

Moreover, when the program operation is completed, the buffer management circuit 102 executes deassignment of the buffer ID (S111).

By the above operations, the buffer ID of the write buffer 301 to be used for the storage of the write data is generated by the preparation process of the write buffer 301 (timing t1), and is discarded when the third update after the completion of the program operation is performed (timing t5). The deallocation of the write buffer 301 is executed when the data-in operation is completed (timing t4), and the new write buffer 301 can be allocated to an area of the RAM 30 released by the deallocation.

In the LUT 302, the buffer ID is associated with the LCA by the first update (timing t2). Then, the correspondence relationship between the LCA and the buffer ID is canceled by the third update, and thus the MCA is associated with the LCA (timing t5).

In the sub-table 303, the MCA is associated with the buffer ID by the second update (timing t3). Then, the correspondence relationship between the buffer ID and the MCA is canceled by the third update (timing t5).

When receiving a read command for reading the above write data, the memory controller 10 specifies a position of the data to be read by using the LUT 302 and the sub-table 303. Therefore, a transfer source of the data transfer for the read command may be different depending on the timing of the read command process.

For example, during the period from the timing t2 to the timing t3, the LCA is associated with the buffer ID in the LUT 302, but this buffer ID is not associated with any MCA in the sub-table 303. Therefore, when processing the read command during this period, the memory controller 10 executes the data transfer to the host 2, of which the transfer source is the write buffer 301 indicated by the buffer ID. In other words, the memory controller 10 reads the data from the write buffer 301 and transfers the read data to the host 2.

During the period from the timing t3 to the timing t5, the LCA is associated with the buffer ID in the LUT 302, and this buffer ID is associated with the MCA in the sub-table 303. Moreover, after the timing t5, the LCA is associated with the MCA in the LUT 302. Therefore, when processing the read command after the timing t3, the memory controller 10 executes the data transfer to the host 2, of which the transfer source is the position indicated by the MCA within the NAND memory 20. In other words, the memory controller 10 reads the data from the NAND memory 20 and transfers the read data to the host 2.

Note that, during the period from the timing t3 to the timing t5, the data-in operation or the program operation is being executed with respect to the write data. Therefore, when the read command process is performed during this period, first, the NAND interface processing circuit 106 stores a read process for the NAND memory 20 in a queue included in itself, and then executes the read process after the completion of the program operation. In other words, after the program operation for data is completed, the memory controller 10 executes, as the read command process, the read of the data from the NAND memory 20 and the transfer of the read data to the host 2.

Next, the operations of host write in the second mode according to the embodiment will be described with reference to FIG. 8.

In Steps S201 to S205, the memory controller 10 executes the same processes as those of Steps S101 to S105 for operations in the first mode explained by using FIG. 7.

After the first update in Step S204 and the notification to the host 2 of the execution completion of the write command in Step S205, the NAND interface processing circuit 106 executes a data-in operation (S206). Note that the MCA indicating the storage destination of the write data is determined by the write controller 105 before the process of Step S206.

In the description of FIG. 8, the LCA specified by the process of Step S201 is simply described as "LCA". Moreover, the buffer ID indicating the write buffer 301 prepared by the process of Step S202 is simply described as "buffer ID". Moreover, the MCA determined before the process of Step S206 is simply described as "MCA".

When the data-in operation is completed, the sub-table management circuit 104 executes a second update (S207). In the second update, the sub-table management circuit 104 registers the MCA in the sub-table 303.

Moreover, the buffer management circuit 102 executes deallocation of the write buffer 301 (S208). Note that, even if the write buffer 301 is deallocated, the use of the buffer ID indicating this write buffer 301 is continued.

Moreover, the NAND interface processing circuit 106 causes the NAND memory 20 (more specifically, the memory chip 21) to execute a program operation (S209). In the program operation, the NAND memory 20 writes the write data to the memory cell array 211. The write destination is a position indicated by the MCA.

When the program operation is completed, the LUT management circuit 103 and the sub-table management circuit 104 execute a third update similarly to Step S110 for the operation in the first mode explained by using FIG. 7 (S210).

Moreover, when the program operation is completed, the buffer management circuit 102 executes deassignment of the buffer ID (S211).

By the above operations, the buffer ID of the write buffer 301 to be used for the storage of the write data is assigned by the preparation process of the write buffer 301 (timing t11), and is deassigned when the third update after the completion of the program operation is performed (timing t14). The deallocation of the write buffer 301 is executed when the data-in operation is completed (timing t13), and thus an area of the RAM 30 released by the deallocation can be allocated to a new write buffer 301. The newly allocated write buffer 301 may be used for the storage of another write data.

In the LUT 302, the buffer ID is associated with the LCA by the first update (timing t12). Then, the correspondence relationship between the LCA and the buffer ID is canceled by the third update, and thus the MCA is associated with the LCA (timing t14).

In the sub-table 303, the MCA is associated with the buffer ID by the second update (timing t13). Then, the correspondence relationship between the buffer ID and the MCA is canceled by the third update (timing t14).

Therefore, during the period from the timing t12 to the timing t13, the LCA is associated with the buffer ID in the LUT 302, but the buffer ID is not associated with any MCA in the sub-table 303. Thus, when processing a read command during this period, the memory controller 10 executes the data transfer to the host 2, of which the transfer source is the write buffer 301 indicated by the buffer ID. In other words, the memory controller 10 reads the data from the write buffer 301 and transfers the read data to the host 2.

During the period from the timing t13 to the timing t14, the LCA is associated with the buffer ID in the LUT 302, and this buffer ID is associated with the MCA in the sub-table 303. Moreover, after the timing t14, the LCA is associated with the MCA in the LUT 302. Thus, when processing a read command after the timing t13, the memory controller 10 executes the data transfer to the host 2, of which the transfer source is the position indicated by the MCA within the NAND memory 20. In other words, the memory controller 10 reads the data from the NAND memory 20 and transfers the read data to the host 2.

Note that, during the period from the timing t13 to the timing t14, the program operation is being executed with respect to the write data. Thus, when the read command process is performed during this period, first, the NAND interface processing circuit 106 stores a read process for the NAND memory 20 in a queue included in itself, and executes the read process after the completion of the program operation. In other words, after the program operation for data is completed, the memory controller 10 executes, as the read command process, the read of the data from the NAND memory 20 and the transfer of the read data to the host 2.

As described above, according to the second mode, a period during which the data transfer to the host 2 of which the transfer source is the write buffer 301 can be performed is longer than that in the first mode. Thus, the read performance in the second mode is higher than that in the first mode.

It can be considered that a technology to be compared with the present embodiment (hereinafter, described as "comparative example") is a technology that enables data transfer to a host of which a transfer source is a write buffer until a program operation is completed. According to the comparative example, a period during which the data transfer to the host of which the transfer source is the write buffer can be performed is longer than that in the second mode, but a timing at which the deallocation of the write buffer can be performed is slower than that in the first mode and the second mode. Thus, when the reading of data stored in the write buffer occurs frequently, the write performance deteriorates because the length of the allocation/deallocation cycle of the write buffer may be extended.

According to the second mode, because the deallocation of the write buffer is executed at an earlier timing than that in the comparative example, the deterioration of write performance can be suppressed. In other words, according to the second mode, it is possible to improve the performance of the write and read together.

Note that, according to the second mode, the period during which the data transfer to the host 2 of which the transfer source is the write buffer 301 can be performed is longer than that in the first mode. When the data transfer to the host 2 of which the transfer source is the write buffer 301 occurs frequently during this period, a period during which the write buffer 301 is being used due to the data transfer becomes longer, and thus the execution timing of the deallocation of the write buffer 301 may be delayed.

Therefore, according to the embodiment, the memory controller 10 executes switching between the first mode and the second mode in response to an access pattern from the host 2.

Figure 9:
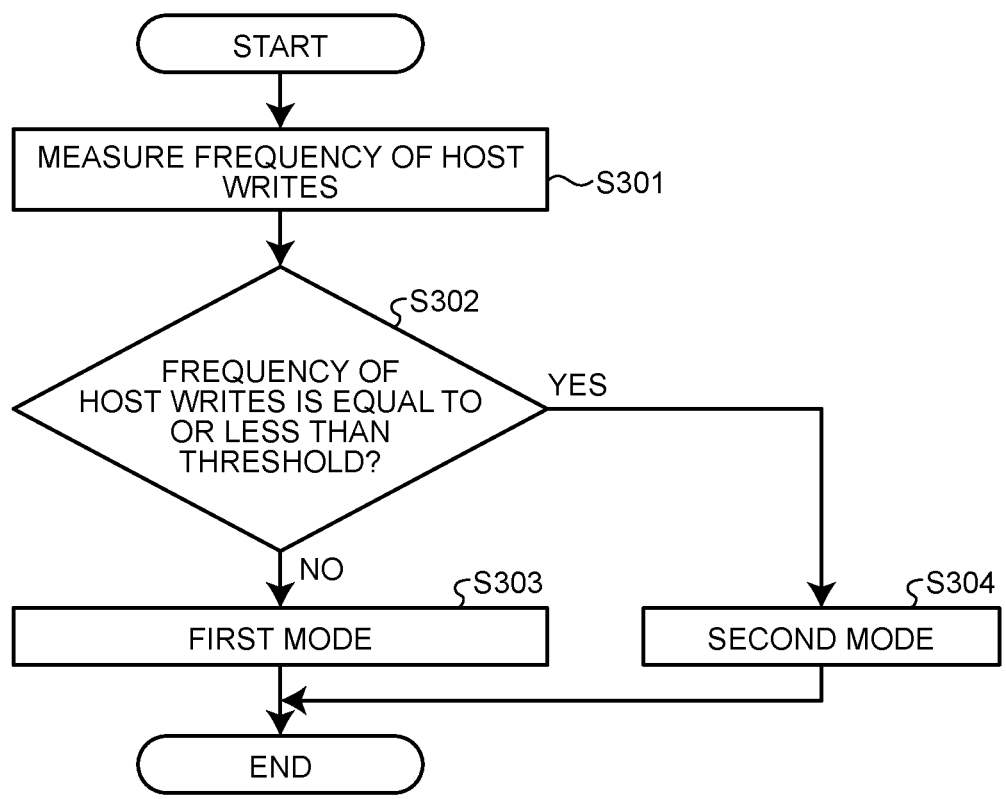
FIG. 9 is a flowchart illustrating an example of operations of mode switching of host write by the memory controller according to the embodiment.

FIG. 9 is a flowchart illustrating an example of operations of mode switching of the host write by the memory controller 10 according to the embodiment.

The memory controller 10 measures a frequency of the host writes (S301). A component that measures the frequency of the host writes is not limited to a specific component. For example, the sub-table management circuit 104 or the NAND interface processing circuit 106 measures the frequency of the host writes.

Moreover, any information corresponding to the frequency of the host writes can be regarded as the frequency of the host writes. For example, the memory controller 10 may measure, as the frequency of the host writes, the number of clusters transmitted to the NAND memory 20 for a predetermined length of time, the number of the write buffers 301 prepared for a predetermined length of time, the number of write commands processed for a predetermined length of time, or the like.

The memory controller 10 determines whether the frequency of the host writes is equal to or less than a threshold (S302). When the frequency of the host writes is not equal to or less than the threshold (S302: No), the memory controller 10 sets a mode of the host write to the first mode (S303). When the frequency of the host writes is equal to or less than the threshold (S302: Yes), the memory controller 10 sets the mode of the host write to the second mode (S304).

The switching operation of the host mode is terminated in Step S303 or S304.

Note that the operations of Steps S301 to S304 are repeatedly executed. The operations of Steps S301 to S304 may be executed in a predetermined time period, or may be executed by using any process as a trigger.

In FIG. 9, when the frequency of the host writes is equal to the threshold, the memory controller 10 sets the mode of the host write to the second mode. When the frequency of the host writes is equal to the threshold, however, the memory controller 10 may set the mode of the host write to the first mode.

As described above, the operation in the second mode is executed exclusively when the frequency of the host writes is low. Thus, even if the execution timing of the deallocation of the write buffer 301 is delayed by the read command process from the host 2, the degradation of the write performance can be suppressed.

Note that the operations of mode switching described above are only an example. For example, the memory controller 10 may execute the mode switching in accordance with the frequency of the read command processes. Specifically, the memory controller 10 may be configured to execute the host write in the second mode when the frequency of the read command processes is higher than a certain threshold, and execute the host write in the first mode when the frequency of the read command processes is lower than the threshold.

Next, the details of the operations of host write in the first mode will be described with reference to FIGS. 10 to 12.

Figure 10:
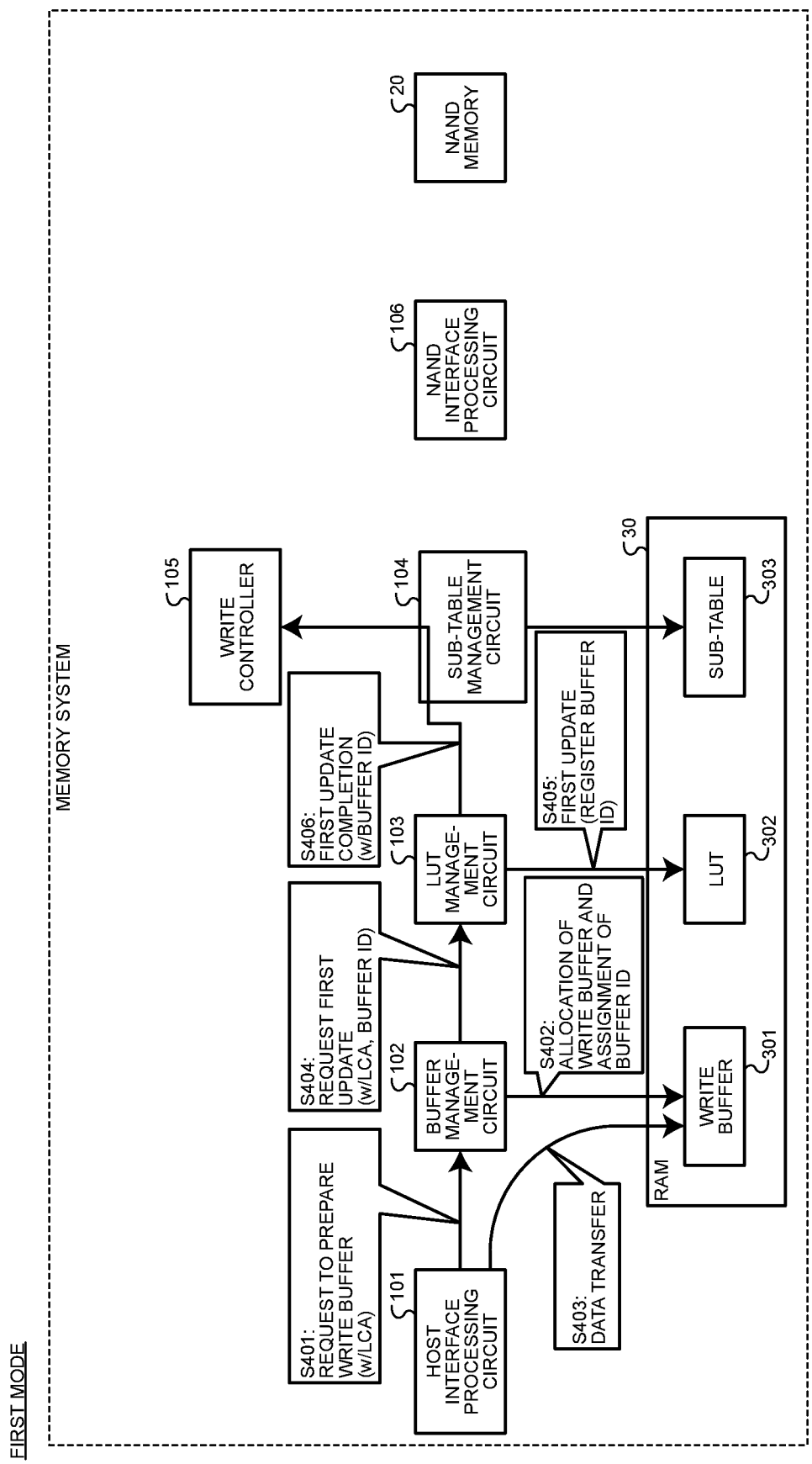
FIG. 10 is a schematic diagram explaining operations up to a first update among the operations of host write in the first mode according to the embodiment.

FIG. 10 is a schematic diagram explaining operations up to the first update among the operations of host write in the first mode according to the embodiment.

When specifying an LCA in the host interface process, the host interface processing circuit 101 requests the buffer management circuit 102 to prepare a write buffer 301 (S401). The request of the preparation of the write buffer 301 includes the LCA.

In response to the request of the preparation of the write buffer 301, the buffer management circuit 102 executes allocation of the write buffer 301 and assignment of the buffer ID (S402). The host interface processing circuit 101 executes data transfer (S403). In other words, the host interface processing circuit 101 acquires the write data from the host 2, and stores the acquired write data in the write buffer 301.

Note that the process of Step S403 is an example of a first operation.

The buffer management circuit 102 transmits a request of the first update to the LUT management circuit 103 (S404). The request of the first update includes the LCA and the buffer ID.

In response to the request of the first update, the LUT management circuit 103 executes the first update, namely, the registration of the buffer ID into the LUT 302 (S405). When the first update is completed, the LUT management circuit 103 notifies the write controller 105 of the first update completion via the sub-table management circuit 104 (S406). The notification of the first update completion includes the buffer ID.

Figure 11:
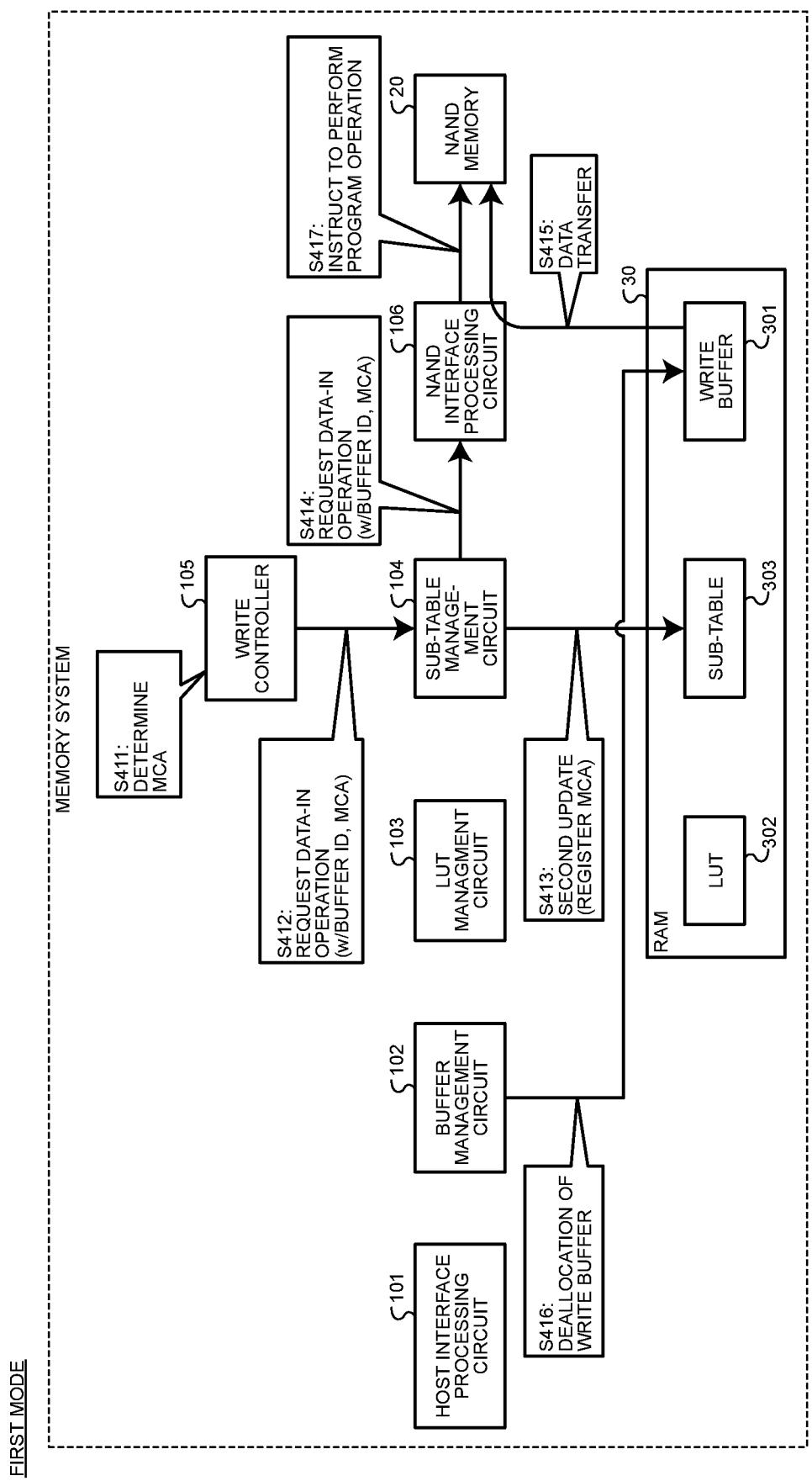
FIG. 11 is a schematic diagram explaining operations from the completion of the first update to the start of a program operation among the operations of host write in the first mode according to the embodiment.

FIG. 11 is a schematic diagram explaining operations from the completion of the first update to the start of the program operation among the operations of host write in the first mode according to the embodiment.

In response to the notification of the first update completion, the write controller 105 determines an MCA (S411). Then, the write controller 105 transmits a request of the data-in operation to the sub-table management circuit 104 (S412). The request of the data-in operation includes the buffer ID and the MCA.

In response to the request of the data-in operation, the sub-table management circuit 104 executes the second update, namely, the registration of the MCA into the sub-table 303 (S413).

Moreover, the sub-table management circuit 104 transfers the request of the data-in operation to the NAND interface processing circuit 106 (S414). The request of the data-in operation includes the buffer ID and the MCA.

In response to the request of the data-in operation, the NAND interface processing circuit 106 executes data transfer (S415). In other words, the NAND interface processing circuit 106 reads the write data from the write buffer 301 and transmits the write data to the NAND memory 20 (more accurately, the memory chip 21).

The process of Step S415 is an example of a second operation.

When the NAND interface processing circuit 106 completes the data-in operation, the buffer management circuit 102 is notified of the data-in completion. In response to the notification of the data-in completion, the buffer management circuit 102 executes the deallocation of the write buffer 301 (S416). Then, the NAND interface processing circuit 106 instructs the NAND memory 20 (more accurately, the memory chip 21) to perform the program operation (S417).

The memory chip 21 instructed of the program operation executes the program operation of writing the write data to the memory cell array 211.

Note that the program operation is an example of a third operation.

Figure 12:
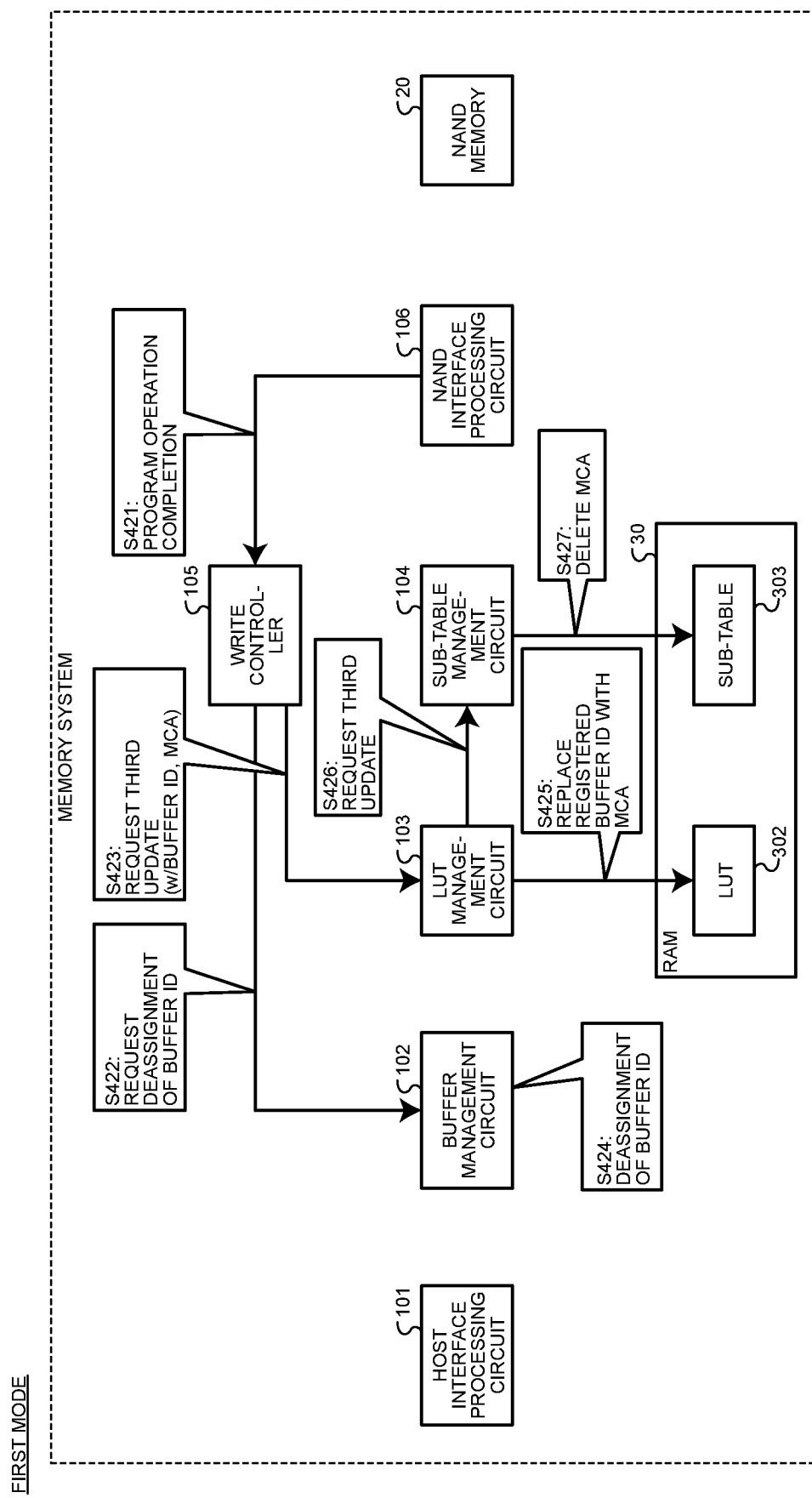
FIG. 12 is a schematic diagram explaining operations after the program operation among the operations of host write in the first mode according to the embodiment.

FIG. 12 is a schematic diagram explaining operations after the program operation among the operations of host write in the first mode according to the embodiment.

When the program operation is completed, the NAND interface processing circuit 106 notifies the write controller 105 of the completion of the program operation (S421).

In response to the notification of the completion of the program operation, the write controller 105 transmits a request of deassignment of the buffer ID to the buffer management circuit 102 (S422), and transmits a request of the third update to the LUT management circuit 103 (S423). The request of the third update includes the buffer ID and the MCA.

In response to the request of deassignment of the buffer ID, the buffer management circuit 102 executes the deassignment of the buffer ID (S424). The buffer ID can be reused by the deassignment.

In response to the request of the third update, the LUT management circuit 103 replaces the buffer ID, which has been registered in association with the LCA in the LUT 302, with the MCA (S425). Moreover, the LUT management circuit 103 transfers the received request of the third update to the sub-table management circuit 104 (S426).

In response to the request of the third update, the sub-table management circuit 104 deletes the MCA registered in association with the buffer ID in the sub-table 303 (S427).

Next, the details of the operations of host write in the second mode will be described.

In the second mode, the same operations as those in the first mode illustrated in FIG. 10 are executed up to the first update. Moreover, in the second mode, the same operations as those in the first mode illustrated in FIG. 12 are executed after the program operation. Thus, herein, operations from the completion of the first update to the start of the program operation among the operations of host write in the second mode are explained, and the descriptions for the other operations are omitted.

Figure 13:
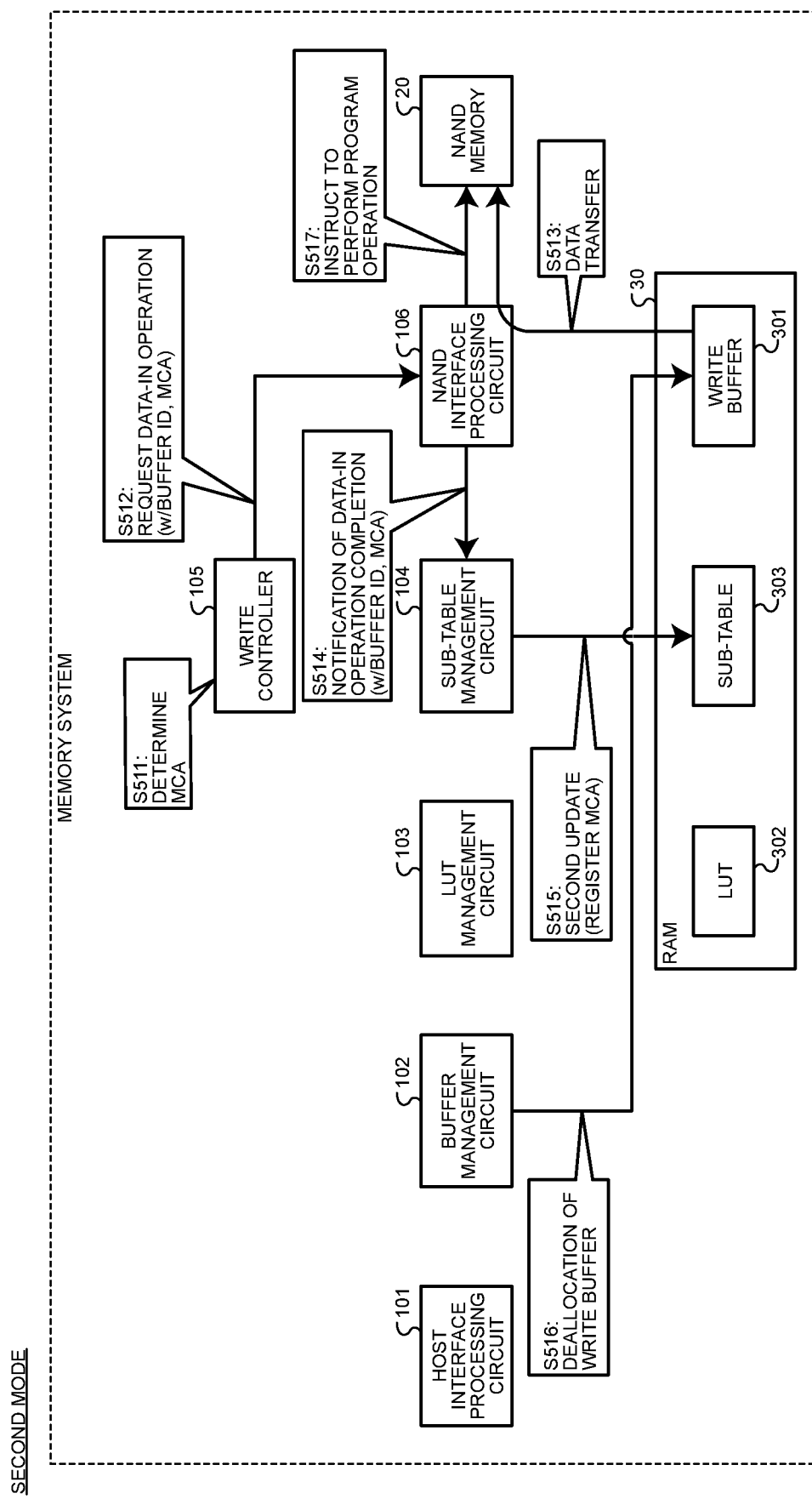
FIG. 13 is a schematic diagram explaining operations from the completion of the first update to the start of the program operation among the operations of host write in the second mode according to the embodiment.

FIG. 13 is a schematic diagram explaining operations from the completion of the first update to the start of the program operation among the operations of host write in the second mode according to the embodiment.

In response to the notification of the first update completion, the write controller 105 determines an MCA (S511). Then, the write controller 105 transmits a request of the data-in operation to the NAND interface processing circuit 106 (S512). The request of the data-in operation includes the buffer ID and the MCA.

In response to the request of the data-in operation, the NAND interface processing circuit 106 executes data transfer (S513). In other words, the NAND interface processing circuit 106 reads the write data from the write buffer 301, and transmits the write data to the NAND memory 20 (more accurately, the memory chip 21).

The process of Step S513 is an example of the second operation.

When the data-in operation is completed, the NAND interface processing circuit 106 notifies the sub-table management circuit 104 of the completion of the data-in operation (S514). The notification of the completion of the data-in operation includes the buffer ID and the MCA.

In response to the notification of the data-in operation completion, the sub-table management circuit 104 executes the second update, namely, the registration of the MCA into the sub-table 303 (S515). Moreover, the buffer management circuit 102 executes the deallocation of the write buffer 301 (S516).

After notifying the sub-table management circuit 104 of the data-in operation completion, the NAND interface processing circuit 106 instructs the NAND memory 20 (more accurately, the memory chip 21) to perform the program operation (S517). The memory chip 21 instructed to perform the program operation executes the program operation of writing the write data to the memory cell array 211.

The program operation is an example of the third operation.

FIG. 14 is a flowchart illustrating an example of the read command process by the memory controller 10 according to the embodiment.

Upon receiving a read command from the host 2 (S601), the memory controller 10 determines whether a buffer ID is associated with an LCA indicating a position of data to be read by using the LUT 302 (S602).

Note that the LCA indicating the position of the data to be read is specified by the host interface processing circuit 101, for example. When the data to be read is configured of two or more clusters, the host interface processing circuit 101 specifies the LCA for each of the two or more clusters. Note that, for simplicity of explanation herein, the data to be read is configured of one cluster.

For example, the LUT management circuit 103 determines whether the buffer ID is associated with the LCA by using the LUT 302.

When it is determined that the buffer ID is not associated with the LCA by using the LUT 302 (S602: No), namely, when an MCA is associated with the LCA, the memory controller 10 reads the data from the position indicated by the MCA in the NAND memory 20 (S603).

When it is determined that the buffer ID is associated with the LCA by using the LUT 302 (S602: Yes), the memory controller 10 determines whether an MCA is associated with that buffer ID by using the sub-table 303 (S604).

When it is determined that the MCA is associated with the buffer ID by using the sub-table 303 (S604: Yes), the program operation for the data to be read has not been yet completed, as is evident from the period from the timing t3 to the timing t5 illustrated in FIG. 7 or the period from the timing t13 to the timing t14 illustrated in FIG. 8. Thus, after the program operation for the data to be read is completed, the memory controller 10 reads the data from the position indicated by the MCA in the NAND memory 20 (S605).

When it is determined that the MCA is not associated with the buffer ID by using the sub-table 303 (S604: No), the memory controller 10 reads the data from the write buffer 301 indicated by that buffer ID (S606).

After Step S603, S605 or S606, the memory controller 10 transmits the data read from the write buffer 301 or the NAND memory 20, to the host 2 (S607). Then, the read command process is completed.

Note that, in the example described above, the memory controller 10 has performed the mode switching of the host write between the first mode and the second mode. The memory controller 10 may perform the mode switching of the host write among three or more modes including the first mode and the second mode. Alternatively, the memory controller 10 may be configured to be able to execute only operations described as the second mode in the host write.

As described above, according to the embodiment, before the second update, namely, at least before the timing at which the data-in operation for write data is completed, the memory controller 10 transfers data to be read to the host 2, by using the write buffer 301 as a transfer source, in accordance with the read command for reading the write data. After the second update, namely, at least after a timing at which the program operation is started, the memory controller 10 reads, from the memory chip 21 in accordance with the read command, data written to the memory cell array 211 by the program operation, and transfers the data to the host 2.

Therefore, it is possible to improve the write performance and read performance together. In other words, the memory system 1 having high performance is obtained.

Moreover, according to the embodiment, the memory controller 10 allocates the write buffer 301 in the RAM 30 in response to the write command, and deallocates the write buffer 301 in response to the completion of the data-in operation.

Moreover, according to the embodiment, the memory controller 10 executes the host write in the first mode when the frequency of the writes from the host 2 is higher than the threshold, and the memory controller 10 executes the host write in the second mode when the frequency of the writes from the host 2 is lower than the threshold.

The operations in the second mode may be executed under a limited condition that the frequency of the host writes is lower than the threshold. Thus, even if the execution timing of the deallocation of the write buffer 301 is delayed by the read command process from the host 2, the degradation of the write performance can be suppressed.

Note that, as described above, the switching condition between the first mode and the second mode is not limited to a condition based on the frequency of the host writes.

For example, the memory controller 10 may execute the host write in the first mode when the frequency of the reads from the host 2 is lower than a threshold, and execute the host write in the second mode when the frequency of the reads from the host 2 is higher than the threshold.

In other words, the memory controller 10 may be configured to execute the switching between the first mode and the second mode in response to the access pattern from the host 2.

Moreover, according to the embodiment, the LUT 302 is stored in the RAM 30 acting as the third memory, and the sub-table 303 is stored in the RAM 30 acting as the fourth memory.

In the first mode, when the allocation of the write buffer 301 is performed, the memory controller 10 registers, in the LUT 302, a correspondence relationship between the LCA specified based on the write command and the buffer ID that is identification information of the write buffer 301 to be allocated. Then, the memory controller 10 determines the MCA before the data-in operation and registers a correspondence relationship between the buffer ID and the MCA in the sub-table 303. Then, in response to the completion of the program operation, the memory controller 10 cancels the correspondence relationship between the buffer ID and the MCA registered in the sub-table 303, and replaces the buffer ID, which has been in the correspondence relationship with the LCA in the LUT 302, with the MCA.

In the second mode, when the allocation of the write buffer 301 is performed, the memory controller 10 registers, in the LUT 302, the correspondence relationship between the LCA specified based on the write command and the buffer ID that is identification information of the write buffer 301 to be allocated. Then, the memory controller 10 determines the MCA before the data-in operation. Then, in response to the completion of the data-in operation, the memory controller 10 registers the correspondence relationship between the buffer ID and the MCA in the sub-table 303. Then, in response to the completion of the program operation, the memory controller 10 cancels the correspondence relationship between the buffer ID and the MCA registered in the sub-table 303, and replaces the buffer ID, which has been in the correspondence relationship with the LCA in the LUT 302, with the MCA.

Then, according to the embodiment, when the LCA is associated with the buffer ID in the LUT 302 but the buffer ID is not associated with the MCA biny the sub-table 303, the memory controller 10 transfers the data to be read from the write buffer 301 to the host 2 in response to the read command. In the case of processing the read command, when the LCA is associated with the buffer ID in the LUT 302 and the buffer ID is associated with the MCA in the sub-table 303, the memory controller 10 acquires the data to be read from the NAND memory 20 after the completion of the program operation and transfers the data to the host 2, in response to the read command. When the LCA is associated with the MCA in the LUT 302, the memory controller 10 acquires the data to be read from the NAND memory 20 and transfers the data to the host 2, in response to the read command.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory system connectable to a host, the system comprising:
 a first memory including a nonvolatile memory cell array;
 a second memory configured to operate at higher speed than the first memory; and
 a memory controller configured to:
 in response to a write command from the host, with respect to first data instructed to be written by the write command,
  execute a first operation that is data transfer from the host to the second memory;
  execute a second operation that is data transfer from the second memory to the first memory; and
  cause the first memory to execute a third operation of writing data transferred by the second operation to the memory cell array, wherein the memory controller is further configured to:
 execute switching between a first mode and a second mode in response to an access pattern from the host; and
 in response to a read command from the host to read the first data,
  in the first mode:
   before a first timing that is a timing at which the second operation for the first data is started, transfer, from the second memory to the host, second data that is the first data stored in the second memory by the first operation, and after the first timing, acquire, from the first memory, third data that is the first data written to the memory cell array by the third operation, and transfer the third data to the host; and in the second mode:
  before a second timing that is a timing at which the second operation for the first data is completed, transfer the second data from the second memory to the host, and
  after a third timing that is a timing at which the third operation for the first data is started, acquire the third data from the first memory and transfer the third data to the host.

2. The memory system according to claim 1, wherein the memory controller is further configured to:
  allocate a first region in the second memory in response to the write command;
  store the first data in the first region in the first operation for the first data;
  transfer the first data from the first region to the first memory in the second operation for the first data; and
  deallocate the first region in response to the second operation for the first data being completed.

3. The memory system according to claim 1, wherein the memory controller is further configured to:
  upon determining that a frequency of writes from the host is higher than a threshold, select the first mode; and
  upon determining that the frequency of the writes from the host is lower than the threshold, select the second mode.

4. The memory system according to claim 1, wherein the memory controller is further configured to:
  upon determining that a frequency of reads from the host is lower than a threshold, select the first mode; and
  upon determining that the frequency of the reads from the host is higher than the threshold, select the second mode.

5. The memory system according to claim 1, further comprising:
  a third memory; and
  a fourth memory, wherein
  the memory controller is further configured to:
    store first management information in the third memory;
    store second management information in the fourth memory;
    allocate a first region in the second memory in response to the write command;
    store the first data in the first region in the first operation for the first data;
    transfer the first data from the first region to the first memory in the second operation for the first data; and
    deallocate the first region in response to the second operation for the first data being completed, and
  the memory controller is further configured to:
    specify a first address indicating a position of the first data in a logical address space based on the write command;
    in the first mode,
      register a correspondence relationship between the first address and identification information of the first region in the first management information when allocating the first region,
      before the second operation, determine a second address indicating a position in the memory cell array and register a correspondence relationship between the identification information and the second address in the second management information, and
      in response to the third operation being completed, cancel the correspondence relationship between the identification information and the second address registered in the second management information, and update the correspondence relationship between the first address and the identification information registered in the first management information to a correspondence relationship between the first address and the second address; and
    in the second mode,
      register the correspondence relationship between the first address and the identification information in the first management information when allocating the first region,
      determine the second address before the second operation,
      register the correspondence relationship between the identification information and the second address in the second management information in response to the second operation being competed, and
      in response to the third operation being completed, cancel the correspondence relationship between the identification information and the second address registered in the second management information, and update the correspondence relationship between the first address and the identification information registered in the first management information to the correspondence relationship between the first address and the second address.

6. The memory system according to claim 5, wherein the memory controller is further configured to:
  transfer, upon determining that the first address is associated with the identification information in the first management information but the identification information is not associated with the second address in the second management information, the second data from the second memory to the host in response to the read command;
  acquire, upon determining that the first address is associated with the identification information in the first management information and the identification information is associated with the second address in the second management information, the third data from the first memory and transfer the third data to the host, in response to the read command; and
  acquire, upon determining that the first address is associated with the second address in the first management information, the third data from the first memory and transfer the third data to the host, in response to the read command.

7. The memory system according to claim 6, wherein the memory controller is further configured to acquire, upon determining that the first address is associated with the identification information in the first management information, and the identification information is associated with the second address in the second management information, the third data from the first memory and transfer the third data to the host, after waiting for the third operation for the first data to be completed, in response to the read command.

8. The memory system according to claim 5, wherein
the memory controller is further configured to allocate, in response to deallocating the first region, an area of the second memory to which the first region has been allocated as a second region for storing fourth data different from the first data.

9. The memory system according to claim 8, wherein
the memory controller is further configured to:
remain registering the correspondence relationship between the first address and the identification information in the first management information after deallocating the first region; and
update the correspondence relationship between the first address and the identification information registered in the first management information to the correspondence relationship between the first address and the second address, in response to the third operation being completed.

10. A method of controlling a memory system, the memory system including a first memory and a second memory, the first memory including a nonvolatile memory cell array, the second memory being configured to operate at higher speed than the first memory, the method comprising:
in response to a write command from a host, with respect to first data instructed to be written by the write command,
executing a first operation that is data transfer from the host to the second memory;
executing a second operation that is data transfer from the second memory to the first memory; and
causing the first memory to execute a third operation of writing data transferred by the second operation to the memory cell array;
executing switching between a first mode and a second mode in response to an access pattern from the host; and
in response to a read command from the host to read the first data,
in the first mode:
before a first timing that is a timing at which the second operation for the first data is started, transferring, from the second memory to the host, second data that is the first data stored in the second memory by the first operation, and after the first timing, acquiring, from the first memory, third data that is the first data written to the memory cell array by the third operation, and transferring the third data to the host; and
in the second mode:
before a second timing that is a timing at which the second operation for the first data is completed, transferring the second data from the second memory to the host, and
after a third timing that is a timing at which the third operation for the first data is started, acquiring the third data, from the first memory and transferring the third data to the host.

11. The method according to claim 10, further comprising:
allocating a first region in the second memory in response to the write command;
storing the first data in the first region in the first operation for the first data;
transferring the first data from the first region to the first memory in the second operation for the first data; and
deallocating the first region in response to the second operation for the first data being completed.

12. The method according to claim 10, further comprising:
upon determining that a frequency of writes from the host is higher than a threshold, selecting the first mode; and
upon determining that the frequency of the writes from the host is lower than the threshold, selecting the second mode.

13. The method according to claim 10, further comprising:
upon determining that a frequency of reads from the host is lower than a threshold, selecting the first mode; and
upon determining that the frequency of the reads from the host is higher than the threshold, selecting the second mode.

14. The method according to claim 10, wherein the memory system further includes a third memory and a fourth memory, and the method further comprises:
storing first management information in the third memory;
storing second management information in the fourth memory;
allocating a first region in the second memory in response to the write command;
storing the first data in the first region in the first operation for the first data;
transferring the first data from the first region to the first memory in the second operation for the first data;
deallocating the first region in response to the second operation for the first data being completed; and
specifying a first address indicating a position of the first data in a logical address space based on the write command;
in the first mode,
registering a correspondence relationship between the first address and identification information of the first region in the first management information when allocating the first region,
before the second operation, determining a second address indicating a position in the memory cell array and registering a correspondence relationship between the identification information and the second address in the second management information, and
in response to the third operation being completed, canceling the correspondence relationship between the identification information and the second address registered in the second management information and updating the correspondence relationship between the first address and the identification information registered in the first management information to a correspondence relationship between the first address and the second address; and
in the second mode,
registering the correspondence relationship between the first address and the identification information in the first management information when allocating the first region,
determining the second address before the second operation,
registering the correspondence relationship between the identification information and the second address in the second management information in response to the second operation being competed, and
in response to the third operation being competed, canceling the correspondence relationship between the identification information and the second address registered in the second management information and updating the correspondence relationship between the first address and the identification information registered in the first management information to the correspondence relationship between the first address and the second address.

15. The method according to claim 14, further comprising:
transferring, upon determining that the first address is associated with the identification information in the first management information but the identification information is not associated with the second address in the second management information, the second data from the second memory to the host in response to the read command;
acquiring, upon determining that the first address is associated with the identification information in the first management information and the identification information is associated with the second address in the second management information, the third data from the first memory and transferring the third data to the host, in response to the read command; and
acquiring, upon determining that the first address is associated with the second address in the first management information, the third data from the first memory and transferring the third data to the host, in response to the read command.

16. The method according to claim 15, further comprising:
acquiring, upon determining that the first address is associated with the identification information in the first management information and the identification information is associated with the second address in the second management information, the third data from the first memory and transferring the third data to the host, after waiting for the third operation for the first data to be completed, in response to the read command.

17. The method according to claim 14, further comprising:
allocating, in response to deallocating the first region, an area of the second memory to which the first region has been allocated as a second region for storing fourth data different from the first data.

18. The method according to claim 17, further comprising:
remaining registering the correspondence relationship between the first address and the identification information in the first management information after deallocating the first region; and
updating the correspondence relationship between the first address and the identification information registered in the first management information to the correspondence relationship between the first address and the second address, in response to the third operation being completed.

* * * * *